Patented Apr. 27, 1937

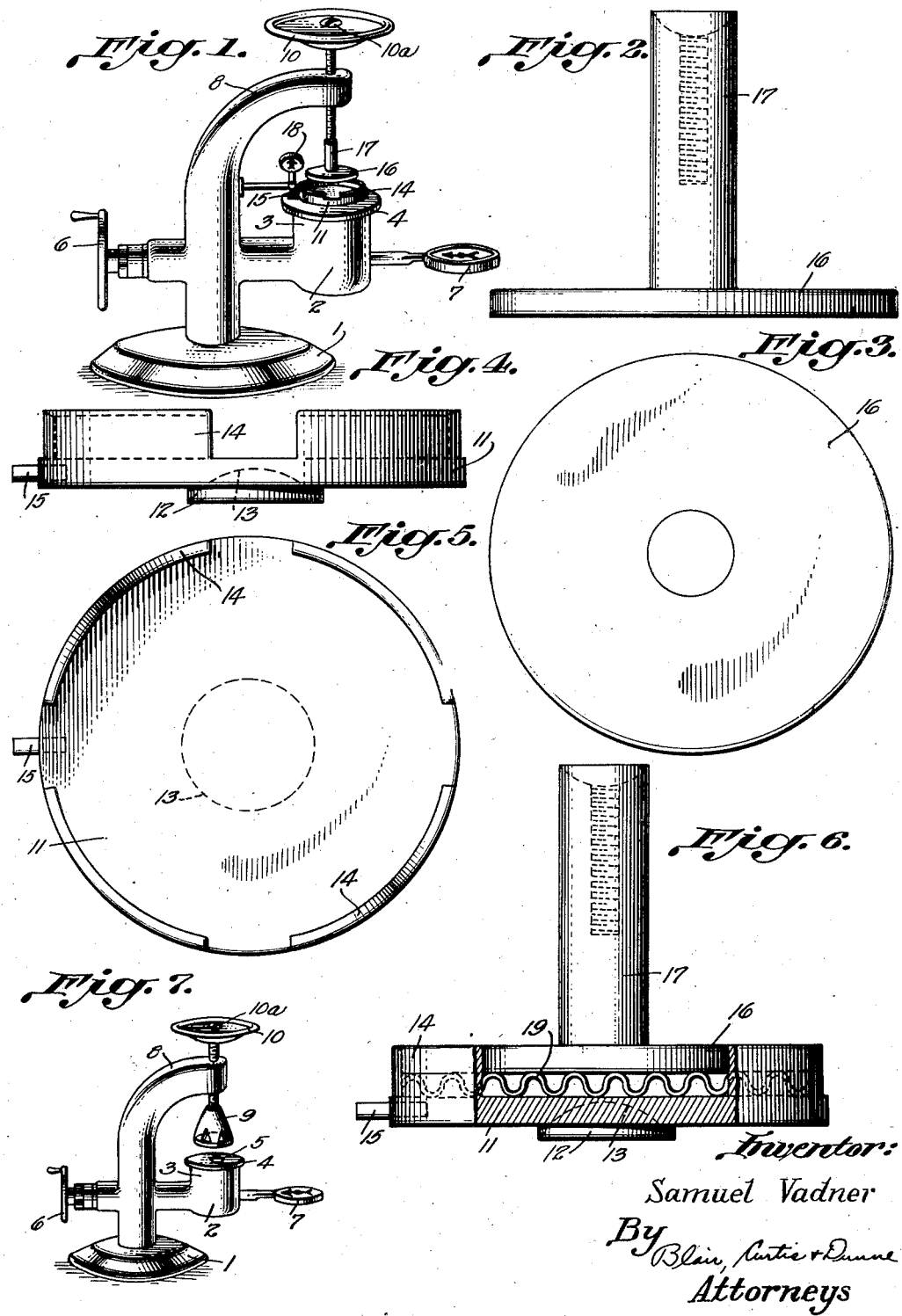

2,078,296

UNITED STATES PATENT OFFICE 2,078,296

MEANS FOR TESTING COMPRESSION STRENGTH OF MATERIALS

Samuel Vadner, Crestwood, N. Y.

Application October 19, 1934, Serial No. 748,993

4 Claims. (Cl. 265—14)

This invention relates to a means for testing the resistance to compression of materials such as corrugated paper board, rubber or other compressible materials.

It is an object of the invention to provide a dependable means for testing the compression strength of compressible materials.

It is a further object to provide a means of measuring both the resistance to compression of such materials and the extent of the compression.

It is a further object of the invention to provide certain improvements in the well known "Mullen tester" which will permit it to be used for testing the compression strength of compressible materials, in addition to its present use of testing the bursting strength of materials.

One illustrative means is disclosed in the drawing, in which:—

Figure 1 is a perspective view of an apparatus embodying the invention.

Fig. 2 is an enlarged side elevation of the upper compression plate.

Fig. 3 is a plan view of the bottom surface of the upper compression plate.

Fig. 4 is a side elevation of the lower compression plate.

Fig. 5 is a top plan view of the lower compression plate.

Fig. 6 is a side elevation partly in section of the upper and lower plates associated together with a strip of corrugated fiberboard interposed between the two plates.

Fig. 7 is a perspective view of the well known "Mullen tester".

Referring to Fig. 7, the Mullen tester there shown is supported by a base member 1. Carried by the base member 1 is a horizontal cylinder member 2 having an upwardly extending portion 3 carrying a disc 4 to support the material to be tested. Disc 4 is provided with a central opening 5 beneath which is located a rubber diaphragm adapted to expand upwardly through the opening 5 when pressure is applied thereto. The cylindrical member 2 is supplied with a liquid which is forced against the rubber diaphragm by a piston operated by turning a wheel 6.

Extending from the right hand end of cylindrical member 2 is a gauge 7 to indicate the amount of pressure being exerted against the diaphragm.

Extending upwardly from the cylindrical member 2 is an arm 8 which extends over above the disc 4. The arm 8 carries a semi-spherical member 9 which may be raised and lowered by turning a handle 10. Member 9 is secured to handle 10 by a bolt 10a. The piece of material to be tested is placed on the disc 4 and the member 9 is lowered to clamp the piece of material on the disc 4. The wheel 6 is then turned to increase the fluid pressure against the bottom of the rubber diaphragm, causing the diaphragm to press upwardly in the form of a spherical segment through the opening 5 and to press against the material being tested. Continued fluid pressure will cause the spherical segment of the diaphragm to burst through the material being tested. The gauge 7 indicates the pressure of the fluid in pounds per square inch at the time the diaphragm bursts the material or breaks through it.

From this brief description of the well known Mullen tester it will be seen that the Mullen tester is adapted to test the resistance of material to a bursting pressure. It is an object of the present invention to provide an attachment which may be used in the Mullen tester to test the resistance of material to compression.

The attachment consists of a lower compression plate 11 (see Figs. 4 and 5) preferably circular in shape and made of durable metal, such, for example, as steel. The lower compression plate 11 is adapted to rest upon disc 4 of the Mullen tester. To prevent slippage, plate 11 is provided on its bottom surface and centrally of the disc with an extension 12 to fit into the opening 5 of the disc 4. The bottom of extension 12 is cut away to form a spherical section 13 to receive the portion of the rubber diaphragm which extends upwardly through the opening 5 when the diaphragm is forced therethrough by the pressure thereagainst.

The upper surface of the lower plate 11 is preferably provided with upwardly extending rim members 14 to retain the material to be tested on the plate 11. Extending from one side of the plate 11 is a pin 15 for operating the gauge which indicates the extent of the compression, all as hereinafter described.

Referring to Figs. 2 and 3, the upper compression member consists of a plate 16 preferably of durable metal such as steel and shaped to correspond to the shape of the lower compression plate 11 and adapted to fit within the rim members 14 of the lower plate 11. Extending upwardly from the center of plate 16 is a threaded shaft 17 secured to the handle 10 of the Mullen tester by means of the bolt 10a as shown in Fig. 1. Thus the upper compression plate may be readily substituted for the member 9 of the Mullen tester.

For measuring the extent of the compression of material being tested, there is attached to the arm 8 of the Mullen tester a dial micrometer 18 having a plunger adapted to rest on the pin 15 of the lower compression plate 11. After the material to be tested is lightly clamped between upper compression plate 16 and lower compression plate 11, the dial of the micrometer is set at zero so that when the lower plate 11 is raised by pressure exerted on the rubber diaphragm, the micrometer will indicate the extent of the upward movement of the plate 11, and hence the extent of the compression of the material lying upon the plate 11.

The operation of the compression testing apparatus will be apparent from the foregoing description. A piece of corrugated fiberboard such as that shown at 19 in Fig. 6 is cut to the size of the lower plate 11, and the lower plate 11 with the fiberboard thereon is positioned on the disc 4 of the tester. Handle 10 is then rotated to lower upper compression plate 16 into firm contact with the corrugated fiberboard. The micrometer is then set to zero. The wheel 6 is then turned to exert liquid pressure against the rubber diaphragm which causes the rubber diaphragm to extend upwardly through the opening 5 in the disc 4 to press against the lower compression plate 11, thus raising the plate 11 and compressing the fiberboard located between the lower plate 11 and the upper plate 16. During the increase in the fluid pressure the gauge 7 registers the amount of the pressure and hence the resistance of the material to compression.

It should be noted that the compression plates engage and clamp between them a comparatively wide area of the material to be tested, and thus permit a compression test as distinguished from a bursting test through the pressure exerted by the rubber diaphragm of the Mullen tester.

It should also be noted that the apparatus of this invention may be used to test the "fatigue" resistance of compressible materials. For example, a piece of corrugated board can be subjected to a certain pressure (not sufficient to entirely crush the material) for a period of time (one or more hours) and then additional pressure applied sufficient to completely crush the material. Thus the resistance to a continuing pressure may be determined.

It will be understood that the invention is not to be limited to the specific embodiment shown for purposes of illustration. For example, the compression plates need not be circular in form.

It will also be understood that all of the features of the invention need not be used conjointly as they may be used in various combinations as defined in the sub-joined claims.

I claim:

1. In apparatus for testing the compression strength of corrugated paper board, the combination of a lower compression plate provided with an upwardly extending rim to receive the corrugated paper board and confine the layers thereof against relative shifting during compression of the board, an upper plate adapted to fit within the rim of the lower plate and to clamp the board on the lower plate, means to hold the upper plate against movement during a testing operation, a rubber diaphragm adapted to engage the central portion of the under side of the lower plate, means to press the diaphragm against the lower plate to raise it, means to indicate the amount of pressure, and means to indicate the extent of movement of the lower plate.

2. In apparatus for testing the compression strength of corrugated paper board, the combination of a lower compression plate provided with an upwardly extending rim to receive the corrugated paper board and confine the layers thereof against relative shifting during compression of the board, an upper plate adapted to fit within the rim of the lower plate and to clamp the board on the lower plate, means to hold the upper plate against movement during a testing operation, a rubber diaphragm adapted to engage the central portion of the under side of the lower plate, means to press the diaphragm against the lower plate to raise it, and means to indicate the amount of pressure.

3. In apparatus for testing the compression strength of corrugated paper board, a pair of compression plates adapted to clamp between them a piece of corrugated paper board, one of said plates being provided with a rim to prevent sidewise shifting of the layers of corrugated board, and the other of said plates being adapted to fit within said rim, a rubber diaphragm, means to press the diaphragm against one plate to move it toward the other plate to crush the material therebetween, and means indicating the extent of such movement and the pressure required to crush the material.

4. In apparatus for testing the compression strength of corrugated paper board, a pair of compression plates adapted to clamp between them a piece of corrugated paper board, one of said plates being provided with a rim to prevent sidewise shifting of the layers of corrugated board, and the other of said plates being adapted to fit within said rim, a rubber diaphragm, means to press the diaphragm against one plate to move it toward the other plate to crush the material therebetween, and means indicating the pressure required to crush the material.

SAMUEL VADNER.